United States Patent [19]

Livingston et al.

[11] Patent Number: 5,248,204
[45] Date of Patent: Sep. 28, 1993

[54] SHORT STACK BEARING ASSEMBLY

[75] Inventors: Raymond S. Livingston; David P. Kutinsky, both of Nisku, Canada

[73] Assignee: Canadian Downhole Drill Systems, Inc., Nisku, Canada

[21] Appl. No.: 835,595

[22] Filed: Feb. 14, 1992

[51] Int. Cl.⁵ .................. E21B 4/02; F16C 19/10
[52] U.S. Cl. ...................... 384/97; 175/107; 384/613
[58] Field of Search .............. 384/93, 94, 97, 453, 384/613; 175/107

[56] References Cited

U.S. PATENT DOCUMENTS

| | | | |
|---|---|---|---|
| 3,754,835 | 8/1973 | Ivanov et al. | 175/107 X |
| 4,135,772 | 1/1979 | Stodt | 384/613 |
| 4,187,918 | 2/1980 | Clark | 175/107 X |
| 4,546,836 | 10/1985 | Dennis et al. | 175/107 |
| 4,577,704 | 3/1986 | Aumann | 175/107 |
| 4,683,964 | 8/1987 | Wenzel | 175/107 |
| 5,074,681 | 12/1991 | Turner | 384/613 |

FOREIGN PATENT DOCUMENTS

1224456  7/1987  Canada .
1234385  3/1988  Canada .

*Primary Examiner*—Thomas R. Hannon
*Attorney, Agent, or Firm*—Wenderoth Lind & Ponack

[57] ABSTRACT

A mud motor bearing assembly is disclosed for an oil-lubricated downhole drill mud motor. A number of parallel sets of angular contact ball bearings are located between the mandrel and the bearing housing in a sealed, oil-filled chamber to provide all compressive thrust load bearing, extension thrust load bearing and radial load bearing capacity. Oil filled pistons at each end retard the progress of mud contamination into the inside of the chamber containing the ball bearings.

18 Claims, 4 Drawing Sheets

SHORT STACK BEARING ASSEMBLY

TECHNICAL FIELD

The present invention relates to a short stack bearing assembly for use in downhole drilling equipment in the oil drilling industry, and in particular with oil lubricated mud motors.

BACKGROUND OF THE INVENTION

In the oil drilling industry, the use of a downhole drilling motor is normally required at depths of several thousand feet. Because of the depth and difficulty involved in such drilling, it is preferable to be able to drill to completion without the necessity of 'tripping out' of the hole. The failure of a motor for any reason while it is at depth will necessitate the expenditure of significant money and significant loss of time in order to trip out and repair or replace the motor. As a consequence, the durability of motors employed at the end of drill strings is extremely important.

In order for a mud motor to function, a bearing assembly must be provided in the drill string between the motor at the bottom of the drill string and the drill bit. The function of this bearing assembly is to allow the drill bit to rotate independently of the drill string. In other words, it permits rotational movement of the drill bit with respect to the fixed body of the mud motor and drill string.

It is known in the prior art to provide bearings consisting of combinations of radial load roller bearings, compressive thrust load roller bearings and extension thrust load roller bearings configured to allow rotational movement of the bottom end of the mud motor bearing assembly with respect to the top end. However, mud motor bearing assemblies incorporating or using conventional bearings for this purpose suffer from a number of deficiencies, and in particular, such mud motor bearing assemblies have suffered from mud contamination in the bearings.

While such mud motor bearing assemblies are normally comprised of oil lubricated sealed chambers containing roller bearings, over time and particularly in the environment in which they are operated, oil leaks out from the sealed chambers as the seals become worn, and mud will become introduced into the sealed chambers of the mud motor bearing assembly. With such roller bearing assemblies, it has been found that the individual rollers gradually disintegrate, and mud and small bits of metal ultimately become jammed in the assembly, causing failure of the entire mud motor bearing assembly.

In addition to the problem just described, there are also a number of other key factors to be considered when designing a downhole mud motor.

When drilling a horizontal or directional bore, or a bore which incorporates a transition from vertical to horizontal or horizontal to vertical, it is often preferable to attain the transition in the shortest possible radius. Thus, the overall length of the mud motor and mud motor bearing assembly is an important factor, and a shorter tool is better able to achieve a shorter radius.

In addition, present technology for performing measurement while drilling (MWD) allows for the accurate determination of the direction and location of the drilling tool and/or any other assemblies at the end of the drill string despite the distance from the surface or the location of the drilling rig. However, in every case, the accuracy of the MWD equipment is enhanced by locating the MWD tools as close to the drill bit as possible. Once again therefore, the length of the mud motor bearing assembly is important as the mud motor bearing assembly must be located between the motor and any such MWD equipment.

As well, overall costs associated with drilling are related among other things to the cost of manufacture of the mud motor bearing assembly and the serviceability of the mud motor bearing assembly. By reducing the cost of manufacturing mud motor bearing assemblies and increasing their serviceability, the profitability of the motors and/or the ability of the manufacturer to compete in the marketplace are augmented. As well, the complexity of the motor, including the mud motor bearing assembly, will determine the cost, speed and convenience of servicing the motor. A motor which is more complex necessarily demands more time and attention to detail and is also more likely to be subject to motor failure.

OBJECTS OF THE INVENTION

The present invention provides an improvement over the prior art by providing a mud motor bearing assembly which is shorter than the normal prior art mud motor bearing assembly, simpler to manufacture, cheaper to manufacture, cheaper and easier to service and more reliable, therefore needing less maintenance in addition, it has been found that by utilizing angular contact ball bearings instead of roller bearings, the motor is less seriously affected by mud contamination and therefore does not suffer breakdowns due to mud contamination as often as prior art assemblies utilising roller bearings.

By virtue of being shorter, the present invention provides a shorter turn radius and measurement while drilling (MWD) equipment located above the mud motor bearing assembly is closer to the drill bit. Better measurements are obtained which are not only more accurate, but also obtained more quickly. By way of illustration, where the mud motor bearing assembly is shortened by four or five feet, operators will notice four or five feet sooner whether or not they are going in the desired direction. This results in a saving of four or five feet of drilling which is important in this field of art.

Thus, according to one broad aspect of the invention, there is disclosed an oil lubricated mud motor bearing assembly for use with a downhole mud motor comprising a hollow cylindrical housing means having a first and, a hollow cylindrical mandrel means having a first end adapted to be rotatably located within the first end of the housing means, a first housing shoulder means located on an inside surface of the housings a second housing shoulder means located on the inside surface of the housing, first mandrel shoulder means located on an outside surface of the mandrel means, second mandrel shoulder means located on the outside surface of the mandrel means, at least one compressive load bearing means comprising angular contact ball bearing means around the outside surface of the mandrel means having an inner race retained between the first and second mandrel shoulder means and an outer race retained between the first and second housing shoulder means oriented to resist compressive thrust load on the bearing housing, at least one extension load bearing means comprising angular contact ball bearing means around the outside surface of the mandrel means having an inner race retained between the first and second mandrel shoulder means and an outer race retained between the first and second housing shoulder means oriented to resist extension thrust load on the bearing housing, an upper seal means located between the first end of the mandrel means and the compressive load and extension load bearing means to provide a relatively liquid tight seal between the mandrel means and the housing means, a lower seal means located between the first end of the housing means and the compressive load and extension load bearing means to provide a relatively liquid tight seal between the mandrel means and the housing means, and means for introducing and retaining lubrication within the housing means between the upper seal means and the lower seal means.

DETAILED DESCRIPTION OF THE INVENTION

Figure 1:
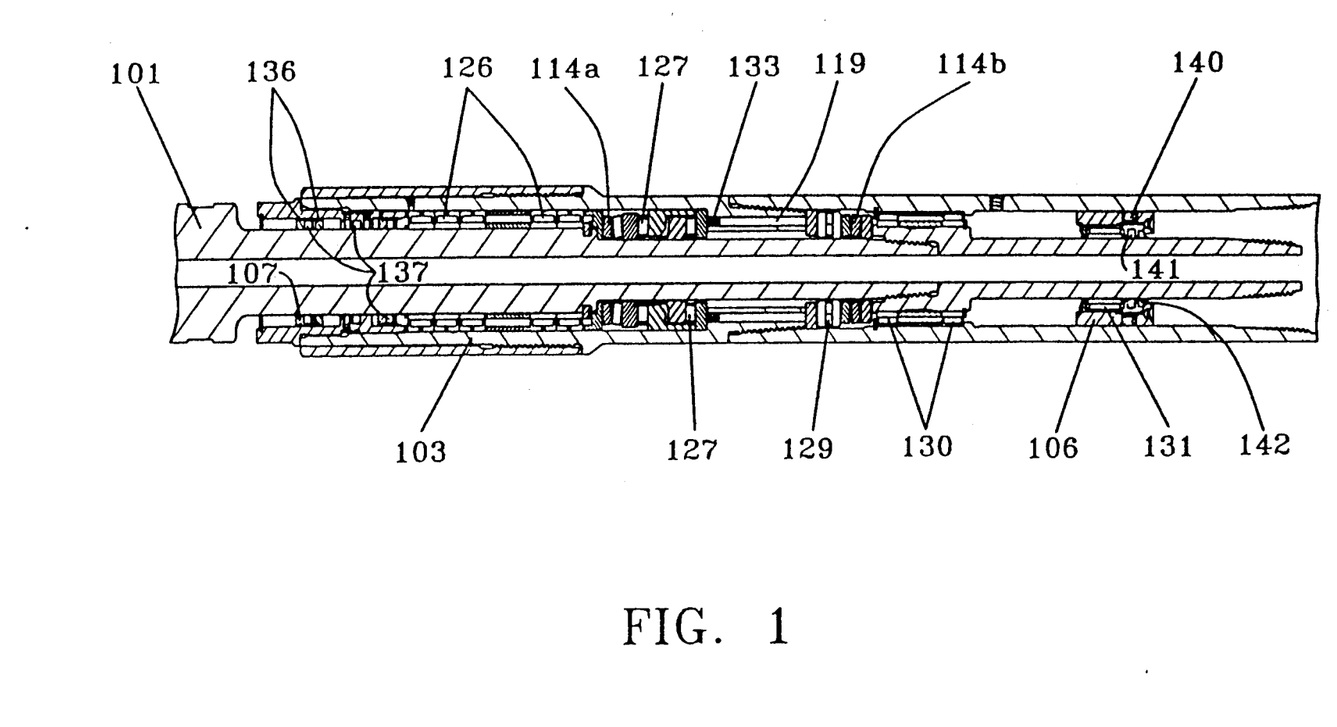
FIG. 1 is a cross sectional view of a typical prior art mud motor bearing assembly.

FIG. 1 illustrates a typical prior art mud motor bearing assembly. As seen in that figure, a mud motor (not shown) would be located to the right of the mud motor bearing assembly when the mud motor bearing assembly was connected and in operation, and a drill bit (also not shown) would be connected to the left of the assembly.

A mandrel 101 is located within a bearing housing 103 such that it may rotate freely within the bearing housing. This is accomplished by providing a number of roller bearings (126, 130 and 131) arranged radially about the axis of the mandrel to counter radial load, the rollers within the roller bearings having their axes arranged parallel to the axis of the mandrel. In addition, further series of roller bearings 127 and 129 are located radially about the axis of the mandrel and disposed perpendicularly to the axis of the mandrel in order to act as compressive thrust load or 'on-bottom' load bearings and extension thrust load or 'off-bottom' load bearings respectively.

Disk springs 114a further act to cushion shock and provide compressive thrust load support for the mud motor bearing assembly. Preload spring 133 acts to maintain a positive pressure on roller bearing 127 to prevent skidding during extension thrust load, performing the same function via pin 119 to roller bearing 129 during compressive thrust load.

When the pump motor is in operation, an internal fluid pressure exists within the mud motor bearing assembly coming from the fluid pressure exerted by the pump motor. This pressure has a tendency to extend the mud motor bearing assembly towards the left as shown in FIG. 1, thus creating an extension thrust load or 'off-bottom' load. Disk springs 114b are therefore provided to cushion against this extension thrust load from the pump motor when the motor is in operation.

By configuring the assembly in this fashion, mandrel 101 is able to rotate freely within the housing 103 when operating in a drilling environment, while at the same time being able to withstand the extension thrust loads caused by gravity and fluid pressure, and the compressive thrust loads caused by drilling. Compressive thrust load bearings 127 and extension thrust load bearings 129 (with the assistance of springs 114a, 114b and 133) permit the mandrel to rotate without binding vertically, while the radial load bearings 126. 130 and 131 permit rotation of the mandrel 101 without binding between the sides of the mandrel 201 and the inside of the housing 103.

The interior of the mud motor bearing assembly is typically sealed and filled with oil to act as lubrication for cooling purposes. Pistons 106 and 107 located at the top and bottom (right and left as shown in FIG. 1) respectively of the assembly along with seals 140, 141, wiper 142, and seals 136, 137 at the top and bottom respectively act to prevent oil from leaking out and to prevent mud from penetrating into the sealed portion of the mud motor bearing assembly. These pistons are free within their range of movement to slide axially along the mandrel. As oil leaks out, these pistons advance towards the centre of the assembly as seen in FIG. 1 under the force of the external hydrostatic pressure, thereby assisting in preventing mud contamination.

At a certain point, mud will eventually contaminate the sealed roller bearing assembly, as it is very difficult under normal operating conditions to prevent some such contamination. In roller bearing assemblies of the kind described, such contamination often results in the apparatus ceasing to function effectively. The introduction of the mud into the roller bearings will cause metal fragments to separate from the bearings, which causes further deterioration of the bearings, and eventually the motor will seize.

Figure 2:
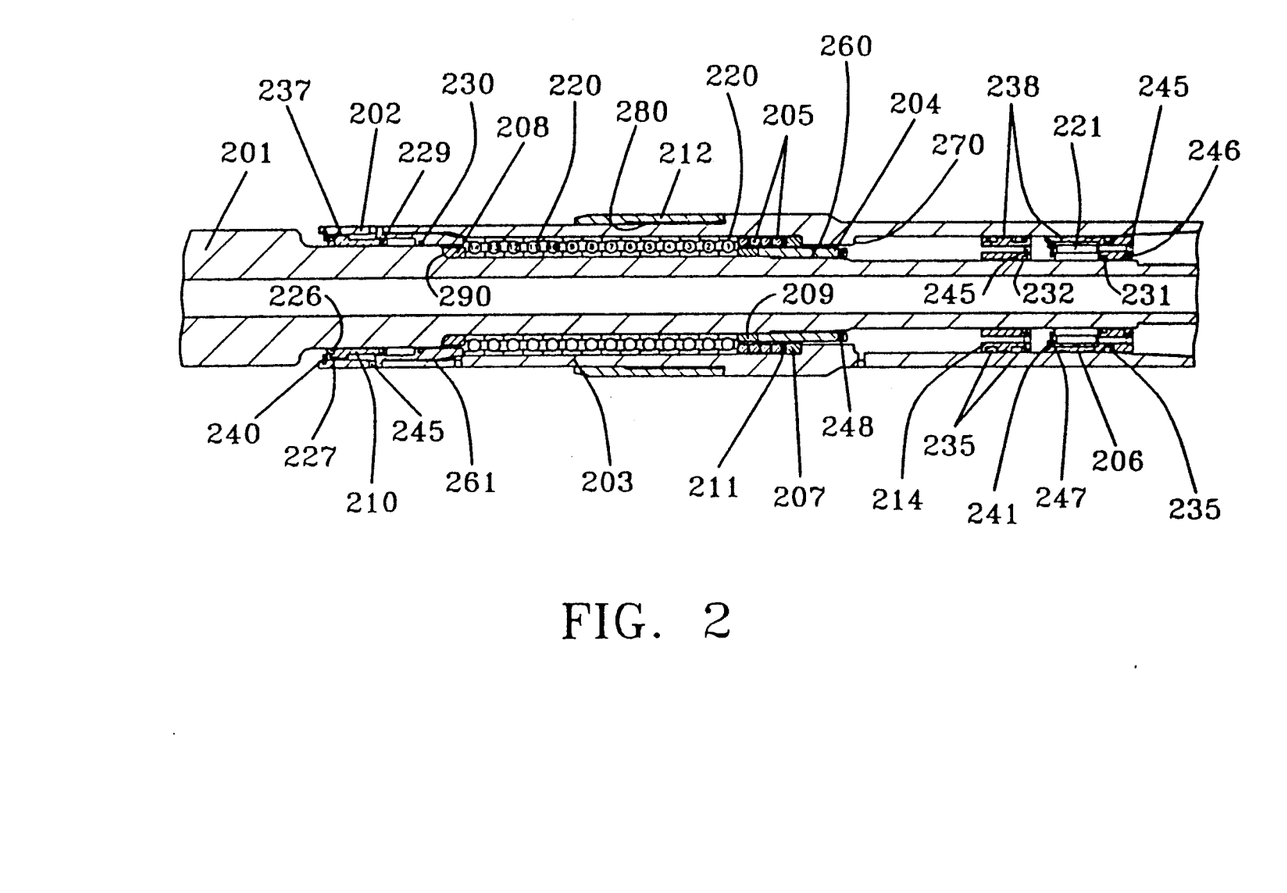
FIG. 2 is a cross sectional view of one embodiment of the present invention.

Referring to FIG. 2, one embodiment of the improved apparatus of the present invention will now be described.

Once again, a mandrel 201 is rotatably located within bearing housing 203. Instead of the roller bearings of the prior art however, a series of angular contact ball bearing assemblies 220 are located in parallel around the mandrel. The angular contact ball bearing assemblies 220 are not fixed to the mandrel, but are instead placed loosely over the mandrel during assembly and held in place as will be described below.

Each of the angular tact ball bearing assemblies 220 is comprised of an inner and outer ball race, outer ball race (each having upper and lower faces 221) and associated ball bearings, and is of conventional design. These assemblies are available commercially as a single ball bearing assembly, held together by a slight lip on one face of the outer ball race as shown in FIG. 2 in order to retain all of the bearings within the ball race. By virtue of the opposite face the outer ball race having a higher profile than the face bearing the lip, the angular contact ball bearing assemblies are able to oppose force in one axial direction.

The width of each inner race is the same as the width of each outer race. Each of the ball bearing assemblies is slid onto the mandrel in turn during assembly, the inner races of all adjacent ball bearing assemblies being in contact with each other when in position as shown, and the outer races of all adjacent ball bearing assemblies being in contact with each other.

The inner ball races are held in place between the preload ring 208 on the mandrel and the mandrel preload nut 204. An extension sleeve 209 may be provided if necessary and a setscrew 248 provided in order to lock the preload nut 204 more securely into position if desired once it has been threaded onto the mandrel on threads 260. The outer ball races are located between disk springs 205 at the upper end and the nose of end cap 202 at the lower end. Disk springs 205 are held in place by a preload shim 211 and a preload ring 207 on the bearing housing 203. End cap 202 is screwed into bearing housing 203 in order to tighten and to secure the entire assembly by means of threads 261.

A steel or brass end cap piston 210 is provided with seals 227, 229 and a wiper 226 in order to provide a substantially fluid-tight barrier to keep oil lubrication within the piston chamber and mud contamination out. While not strictly necessary, wiper 226 serves to keep larger particles of mud contamination away from the seals. Wear ring 237 may be provided to protect the material of the outside of the end cap piston from wear by preventing contact between the end cap piston and the end cap as the piston moves axially with respect to the end cap 202. The wear ring 237 is of conventional design and maintains a physical separation between the inside bore of the end cap 202 and the outside of the end cap piston 210. The inside of the piston may be built up with brass in the vicinity of seal 229 to improve wear.

In the preferred embodiment, the inside bore of the end cap 202 may be chromed to reduce wear. The end cap is built up with brass where it touches the mandrel to allow the mandrel to rotate freely without 'picking up' and a further seal 230 provided. The seals Used throughout are patented Kalsi (trade-mark) seals, although a Polypak (trade-mark) seal could also be used or a mechanical seal of the type generally made of carbide. However, the Kalsi seal is preferred because it is more reliable for this application.

A snap ring 240 is provided within the and cap 202 to limit and retain the end piston 210. The end piston 210 is capable of movement to the right as shown in FIG. 2 for a limited distance in order to compensate for gradual oil leakage from within the piston chamber. A plug 245 is provided to enable access to the inside of the piston chamber for purposes of filling, discharging and replacing the oil lubrication within the piston chamber. The internal oil pressure of the end cap piston 210 is independently determined by its initial pressurization prior to deployment for drilling.

A top piston 206 is provided at the top of the mud motor bearing assembly, capable of movement to the left as seen in FIG. 2, for a distance limited by an optional internal piston 214 which in turn is limited by an internal shoulder 270 on the bearing housing 203. The top piston 206 is provided with wear rings 238, seals 231, 235 and wiper 246, along with plug 245 for access, in a fashion similar to end piston 210. The inside of the outer housing may be chromed and the outside of the mandrel covered in chrome or carbide at this point to provide a hard surface for the seals to move over. However, in contrast to the end cap piston, the internal oil pressure within the sealed portion of the mud motor bearing assembly (to the left of top piston 206 in FIG. 2 and including the space occupied by the ball bearing assemblies) will be dictated by the mud pressure acting upon outer or top piston 206.

A roller bearing 221 comprising a series of rollers is located within the top piston as shown, in order to provide extra stability to the mud motor bearing assembly and to accommodate vibration from the drive shaft in operation. A piston bearing retainer ring 247 is located to secure the bearings to the piston and a snap ring 241 is provided to complete the assembly of the piston. In addition to being more expensive in some cases than roller bearings, it has been found that ball bearings are not necessary for this purpose and conventional roller bearings may be used at this point. In general, it is found that mud will enter the sealed portion of the mud motor bearing assembly from the bottom of the tool rather than the top. This is due to the hydrostatic pressure existing outside of the end cap from the force of the mud being pumped through the tool and back to the surface, and the larger surface area of seals 229 and 230 causing quicker wear on those seals than seals 231 and 232. Consequently, mud generally enters the tool from the bottom rather than the top and will work its way up the tool from the bottom to contaminate the bearings, a process that normally takes a considerable amount of time.

Finally, an extra internal piston 214 may be provided which is similarly provided with seals 235, seal 232 and plug 245 along with wear ring 238. Internal piston 214 is capable of movement to the left as seen in FIG. 2, for a distance limited by an internal shoulder 270 on the bearing housing 203. While this piston is not necessary for the functioning of the invention, it serves as a backup to the top piston 206 and may serve to protect roller bearing 221 from mud contamination from below, as well as adding extra support to the mandrel at this point.

In the particular embodiment shown, a thread protector 212 is located externally about the bearing housing 203 to protect threads 280, which are designed for receiving accessories not related to the functioning of the invention.

It will be seen that the ball bearing assemblies marked 1 through 14 in FIG. 2 are not identically configured. Ball bearing assemblies 1 through 6 are configured in tandem as compressive thrust load bearings—i.e.—to absorb compression—while ball bearing assemblies 7 and 8, 9 and 10, 11 and 12, and 13 and 14 are configured as pairs of back to back ball bearing assemblies to act as extension thrust load bearings and compression thrust load bearings.

Figure 4:
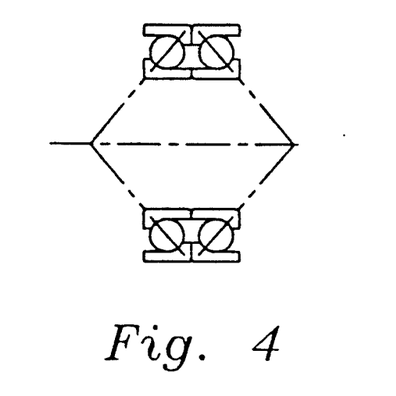
FIG. 4 shows two sets of angular contact bearings of the invention arranged back to back.

The purpose for this is best illustrated by FIG. 4 showing diagrammatically the load lines of ball bearing assemblies arranged back to back. It will be seen that the load lines of such ball bearing assemblies diverge towards the ball bearing assembly axis, such that axial loads acting in either axial direction may be accommodated. Ball bearing assemblies mounted back to back in this manner provide a relatively stiff configuration which can resist tilting moment.

Figure 5:
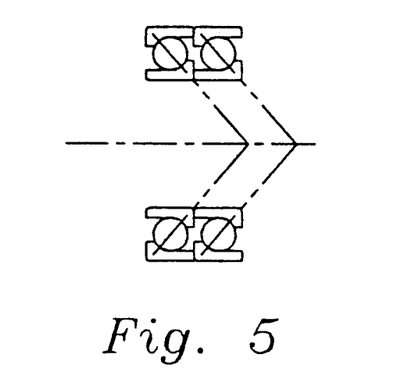
FIG. 5 shows two sets of angular contact bearings of the invention arranged in tandem and FIG. 6 shows two sets of angular contact bearings of the invention arranged face to face.

The arrangement of ball bearing assemblies 1 through 6 is exemplified by FIG. 5 showing a pair of ball bearing assemblies in tandem. In such a case, the load lines are in parallel, and radial and axial loads are divided between the ball bearing assemblies. However, such ball bearing assembly pairs are only able to accommodate axial loads in one direction, i.e.—to counteract a load acting upon the inner races from the right as shown in FIG. 5.

Figure 6:
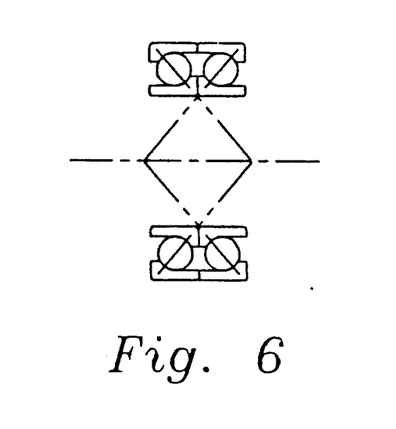

When ball bearing assemblies are mounted face to face as shown in FIG. 6, and as found in, for example, ball bearing assembly pair 6 and 7, the load lines of the ball bearing assemblies converge towards the ball bearing assembly axis. Once again, axial loads in either direction may be accommodated and a relatively stiff configuration is provided which can resist tilting moment, although not quite as stiff as the back to back configuration shown in FIG. 4.

The operation of the mud motor bearing assembly will now be described with reference once again to FIG. 2.

Mud being pumped from the surface under pressure will travel down the interior of the drill string to the power section (not shown) located to the right of the mud motor bearing assembly shown in FIG. 2. This power section may be a positive displacement motor or a turbine, these being the two most commonly used forms of power sections for downhole motor assemblies. The Mud being pumped through the power section will cause rotation of an interior rotor, which transfers the rotational energy either to a drive shaft, bearing mandrel and drill bit, or directly to the bearing mandrel 201 and to the drill bit.

Because the mud flowing within the mud motor bearing assembly is under pressure, it will create an axial extension thrust load or 'off-bottom' load on the mud motor bearing assembly—i.e. it will cause the tool to tend to extend axially outwardly (to the left as seen in FIG. 2). When the tool bit connected to the mandrel touches the bottom of the drill hole, the force on the assembly will then be reversed and the assembly will experience an axial compressive thrust load or 'on-bottom' load upwardly back into the drill string. In addition, however, when the drill bit is at the bottom, the drill bit and mandrel will experience a radial load perpendicular to the axis of the mud motor bearing assembly because of the compressive force created between the force of gravity and drill force acting downwardly from above and the resistance from the bottom of the drill hole acting upwardly from below.

While conventional assemblies require several radial and thrust bearings, the apparatus of the present invention is able to accommodate the radial load, the compressive thrust load and the extension thrust load by the parallel series of angular contact ball bearing assemblies 220.

The extending thrust load occurring on the mandrel 201 principally due to mud pressure is transferred from the mandrel 201 to the preload nut 204 threaded onto the bearing mandrel 201. The preload nut 204 is in contact via extension sleeve 209 with the inner race of ball bearing assembly 220 marked number 1 in FIG. 2. This subsequently transfers the load along the inner races 1 through 13 of the assembly. Ball bearing assemblies number 7, 91 11 and 13 are installed opposite in direction to ball bearing assemblies 1 through 6, 81 10, 12 and 14 such that they oppose an extending thrust load. Therefore, at ball bearing assemblies 7, 9, 11 and 13, the load is transferred from the inner race through the balls into the outer races of those ball bearing assemblies. In consequence of this, the inner race of ball bearing assembly 14 will usually be under a reduced load as the load will have been substantially or completely transferred to the outer races by that point.

Thus during an extending thrust load, the load will be transferred via ball bearing assemblies 7, 9, 11 and 13 to the outside races, and all of the outer races of ball bearing assemblies 7 through 14 will undergo compression. The outer race of 14 acts merely as an extension of the end cap to come into contact with the outer race of ball bearing assembly 13. The extending load subsequently goes through the outer race of ball bearing assembly number 14 and onto the nose of the end cap 202 which is threaded via threads 261 into the bearing housing 203 and thus forms an integral part of the bearing housing 203 and thus of the drill string.

When the drill bit is at the bottom of the hole and drilling, an upward compressive thrust load is created, This compressive thrust load is accommodated by the shoulder 290 on the mandrel 201. Shoulder 290 of the mandrel acts on the preload ring 208 on the mandrel which is in contact with the inner race of ball bearing assembly number 14. This transfers the load through the inner races of ball bearing assemblies 14 through 1. Ball bearing assemblies number 14, 12, 10, 8 and 6 through 1 are installed on the mandrel such that they oppose a compressive thrust load. Accordingly, the upward compressive thrust load is transferred equally through the balls to the outer races respectively of those ball bearing assemblies and subsequently transferred along the outer races 14 through 1, through the disk springs 205 onto the preload ring 207 of the bearing housing and from there, onto the bearing housing 203, thus forming an integral part of the bearing housing and of the drill string.

It will be seen that in the embodiment described, extending thrust loads are absorbed by ball bearing assemblies 7, 9, 11 and 13. Compressive thrust loads are absorbed by ball bearing assemblies 1 through 6, 8, 10, 12 and 14. Radial load created when the drill bit is at bottom is absorbed by all 14 ball bearing assemblies.

It will be observed that only 4 ball bearing assemblies have been configured as off-bottom or extension thrust load bearings, while the remaining ten in this particular embodiment have been configured as compressive thrust load bearings. The reason for this is that the extension thrust load experienced in a typical mud motor bearing assembly is much less than the compressive thrust load it is likely to undergo. In a typical installation, the extension thrust load may be of the order of 10,000 pounds while a typical compressive thrust load may be of the order of 50,000 pounds. Thus, more of the bearings are configured as compressive thrust load bearings.

While these off-bottom or extending thrust load bearings could be located anywhere within the series of 14 ball bearing assemblies, it is preferable to locate them towards the bottom of the mandrel as the highest radial load occurs towards the bottom of the series of ball bearing assemblies. Thus in the particular example shown in FIG. 2, the off-bottom load bearings are alternated evenly with compressive thrust load or on-bottom load bearings. In addition, as discussed previously, by placing the ball bearing assemblies in back to back configuration as shown in FIG. 4 starting with ball bearing assembly pair 14 and 13, the highest resistance to tilt is obtained, which again will be greater towards the bottom of the mud motor bearing assembly.

It has been found that with conventional assemblies of radial load roller bearings, compressive thrust load roller bearings and extension thrust load roller bearings, the majority of failures can be attributed to mud contamination in the bearings. With the apparatus of the present invention, we have determined that mud contamination in the bearings does not cause failure of the tool as quickly, even where motors have been found to be highly contaminated with mud. This apparatus thus constitutes an improvement over such prior art roller bearing assemblies.

In addition, because of the manner in which the apparatus of the present invention is constructed, a mud motor bearing assembly is provided which is generally shorter, simpler, cheaper to manufacture, cheaper and easier to service and more robust than equivalent prior art mud motor bearing assemblies and thus improved.

It will be obvious to one skilled in the art that the placement of the ball bearing assemblies illustrated in FIG. 2 is but one possible configuration. As each ball bearing assembly is capable of handling either upward thrust or downward thrust along with radial load at the same time, by proper placement in the tool, these ball bearing assemblies provide a more compact and robust mud motor bearing assembly than the prior art.

Figure 3:
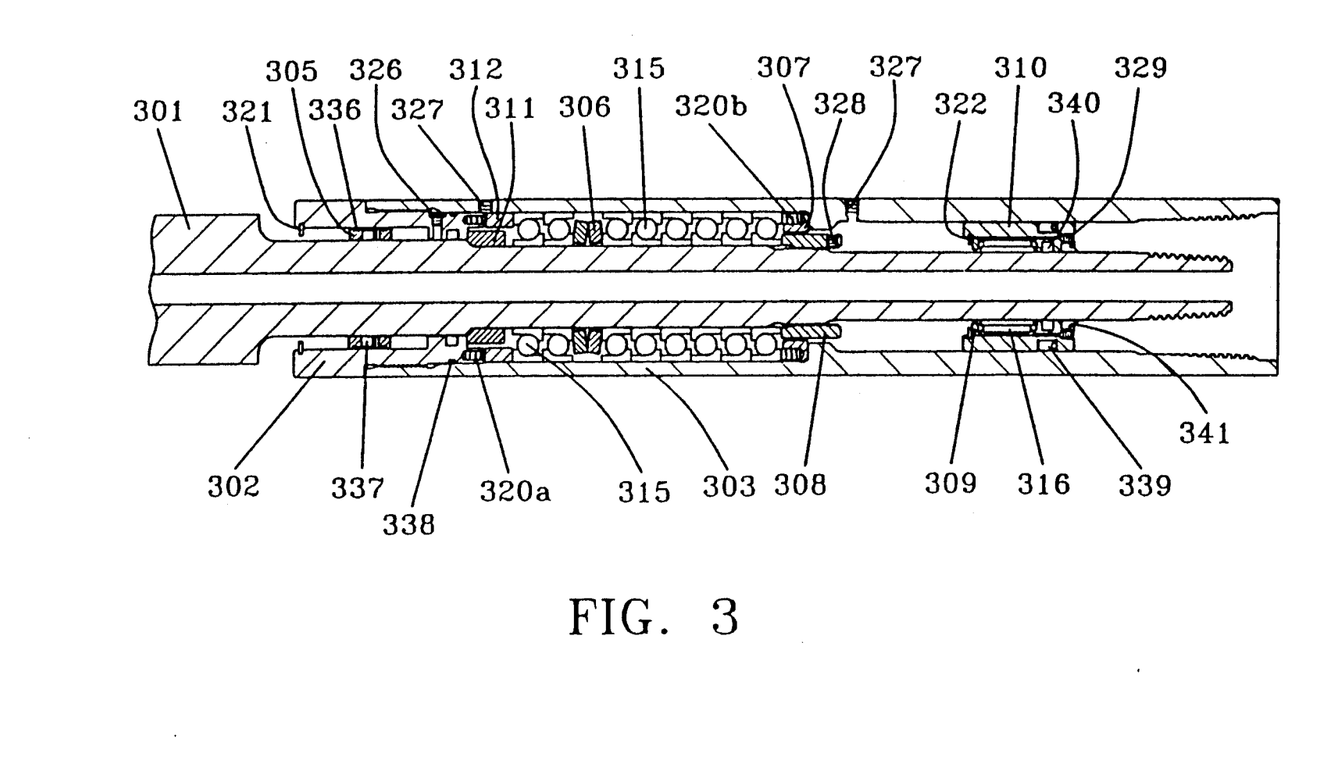
FIG. 3 is a cross sectional view of an alternative embodiment of the present invention.

An alternative embodiment of the present invention is shown in FIG. 3. In this embodiment, a somewhat simplified bottom piston 305 is located about mandrel 301 and limited in its travel by snap ring 321 and the internal shoulder of end cap 302. Plug 326 allows access to the interior of the piston chamber for drainage and filling of lubrication. Seals 336 and 337 and 338 provide a relatively liquid tight seal between the mandrel and the bearing housing 303. A further plug 327 is provided in the outside of the housing 303, allowing access to the sealed interior of the mud motor bearing assembly for lubrication purposes.

Load ring 311 on the mandrel 301, preload ring 312 on the housing 303 and spring 320a provide support for one end of the series of ball bearing assemblies denoted generally as 315 in FIG. 3. Spring 320b, preload ring 307 on the housing 303 and preload nut 308 threaded onto mandrel 301 provide support at the other end. Setscrew 328 may be used to secure preload nut 308 into position. In addition, a pair of disk springs 306 is located within the series of ball bearing assemblies, maintaining outwardly directed pressure on the inner ball races. Springs 320a and 320b act to maintain positive pressure on all of the outer ball races in order to prevent possible slippage leading to uneven or flat wear on individual ball bearings.

In this particular embodiment, the ball bearing assemblies 315 have been configured as a series of 6 ball bearing assemblies in tandem (illustrated to the right of the disk springs 306 in FIG. 3) providing compressive thrust load or on-bottom load bearing capability and a pair of ball bearing assemblies in tandem on the opposite side of the disk springs 306 disposed in the opposite direction to counteract extension thrust load or off-bottom load forces seeking to extend the mandrel from the housing.

Thus, two ball bearing assemblies are provided to counteract extension or off-bottom load, and six ball bearing assemblies are provided to counteract compressive thrust or on-bottom load, Because of the presence of disk springs 306 between the inner races of the second and third ball bearing assemblies, it will be seen that all compressive thrust load will be transmitted through the inner race of the two extension thrust load bearings and the disk springs to the remaining six compressive thrust load bearings. Similarly, all extension thrust load is transmitted through the inner races of the six compressive thrust load bearings and the disk springs to the inner races of the extension load thrust bearings, and thereafter through the balls to the outer races of the extension load thrust bearings onto the shoulder of end cap 302. All radial load will be counteracted by all eight angular contact ball bearing assemblies.

At the top part of the mud motor bearing assembly, an upper piston 310 is provided along with seals 339 and 340 and wiper 341 to provide a substantially liquid-tight seal between the mandrel and the housing 303. A plug 329 is provided for access and a further access point is provided by means of a further plug 327 for access to the sealed interior of the mud motor bearing assembly.

A roller bearing 316 comprised of a series of rollers is provided within the piston located radially about the mandrel 301 and in parallel with the axis of the mandrel to provide extra vertical stability to the mud motor bearing assembly at the top end of the mandrel 301 and to accommodate vibration from the drive shaft in operation. A piston bearing retainer ring 309 is located to secure the bearings to the piston and a snap ring 322 is also provided to complete the assembly of the piston.

It will be seen that this alternative embodiment is even shorter than the embodiment described in FIG. 2.

The number and diameter of the ball bearings chosen for any particular size of mud motor bearing assembly is dependant upon the anticipated loads to be supported and is calculated in conventional fashion. For example, in the particular embodiment shown in FIG. 2, approximately 20 balls of approximately ⅝ of an inch in diameter were fitted around a mandrel having a 5½ inch diameter. In the embodiment shown in FIG. 3, approximately 12 balls of approximately ¼ inch in diameter were provided around a mandrel having a 2¾ inch diameter at that point.

By the provision of the apparatus of this invention, a mud motor bearing assembly is provided which is significantly shorter than conventional mud motor bearing assemblies, simpler and therefore cheaper to manufacture, less costly to maintain, more durable, and more easily serviced than is the norm. The simplicity of servicing the assembly may itself lead to further savings because training of service personnel may be less expensive, and the servicing may be less prone to error. The invention in operation due to its design and configuration has proven to be a very durable mud motor bearing assembly which is significantly shorter than most mud motor bearing assemblies available on the market today.

It will be obvious to one skilled in the art that the foregoing constitute only two possible embodiments of the invention, and it will also be obvious to one skilled in the art to suggest alternative configurations without departing from the scope and spirit of our invention.

What we claim as our invention is:

1. An oil lubricated bearing assembly for a downhole mud motor comprising:
    (a) a hollow cylindrical housing having an upper end and a lower end,
    (b) a hollow cylindrical mandrel rotatably located in the housing;
    (c) upper and lower shoulder means on the inside of the housing, and on the outside of the mandrel;
    (d) two or ore angular contact ball bearing means arranged adjacent each other between the mandrel and the housing along the axis of the housing and mandrel, each bearing means having ball bearings carried in inner and outer races arranged around the mandrel at least two of said ball bearing means having at least one face on each of said inner and outer races in abutting contact with adjacent faces on the inner and outer races of an adjacent ball bearing means; and the inner races being retained between the shoulder means on the mandrel and the outer races between the shoulder means on the housing;

(e) upper seal means between the mandrel and housing located between said upper end of the housing and said upper shoulder means;

(f) lower seal means between the mandrel and housing located between said lower end of the housing and said lower shoulder means;

(g) means for introducing and retaining lubrication within the housing means between the upper seal means and the lower seal means; and (h) wherein the upper and lower races of the respective ball bearing means are oriented such that at least one ball bearing means is arranged as a compression load bearing means and at least one ball bearing means is arranged as extension load bearing means.

2. The apparatus of claim 1 wherein the distance between the upper and lower faces of each inner and outer race is the same.

3. The apparatus of claim 1 including an equal or greater number of compressive load bearing means than extension load bearing means, 4. The apparatus of claim 3 wherein at least one extension load bearing means is located between two compressive load bearing means.

5. The apparatus of claim 4 wherein no extension load bearing means is in contact with another extension load bearing means.

6. The apparatus of claim 5 including disk spring means resistant to compression located between and acting upon an outer race of a compressive load bearing means and a housing shoulder means.

7. The apparatus of claim 6 wherein the extension load bearing means are located as close to the lower end of the housing means as possible.

8. The apparatus of claim 7 including ten angular contact ball bearings means acting as compressive load bearing means and four angular contact ball bearing means acting as extension load bearing means.

9. The apparatus of claim 6 wherein all of the compressive load bearing means are located between the resistive spring means and the upper end of the housing.

10. The apparatus of claim 5 wherein the extension load bearing are located as close to the lower end of the housing means as possible.

11. The apparatus of claim 10 including ten angular contact ball bearing means acting as compressive load bearing means and four angular contact ball bearing means acting as extension load bearing means.

12. The apparatus of claim 10 wherein the extension load bearing means are located between all compressive load bearing means and the lower end of the housing.

13. The apparatus of claim 12 including disk spring means resistant to compression located and acting upon an inner race of an extension load bearing means and an inner race of a compressive load bearing means.

14. The apparatus of claim 13 including spring means resistant to compression located between and acting upon the upper and lower housing shoulder means and the outer race of the extension load bearing means or compressive load bearing means immediately adjacent said upper and lower housing shoulder means.

15. The apparatus of claim 14 including six angular contact ball bearing means acting as compressive load bearing means and two angular contact ball bearing means acting as extension load bearing means.

16. The apparatus of claim any one of wherein the upper seal means and lower seal means each include piston means slidably located around the mandrel means in relatively liquid tight contact with the mandrel and the housing and capable of axial movement.

17. The apparatus of claim 16 wherein the piston means in the upper seal means includes roller bearing means immediately adjacent an upper portion of the mandrel means.

18. The apparatus of claim 17 wherein the upper oil seal means further includes an inner piston slidably located around the mandrel means in relatively liquid tight contact with the mandrel means and the housing means and capable of axial movement between the piston means and the compressive load and extension load bearing means.

* * * * *

UNITED STATES PATENT AND TRADEMARK OFFICE
CERTIFICATE OF CORRECTION

PATENT NO. : 5,248,204
DATED : September 28, 1993
INVENTOR(S) : Raymond S. Livingstone etal It is certified that error appears in the above-indentified patent and that said Letters Patent is hereby corrected as shown below:

On the title page, first inventor should read
-- Raymond S. Livingstone --.

Signed and Sealed this

Twenty-ninth Day of March, 1994

Attest:

BRUCE LEHMAN

*Attesting Officer*     *Commissioner of Patents and Trademarks*